US011649908B2

(12) United States Patent
Neu

(10) Patent No.: US 11,649,908 B2
(45) Date of Patent: May 16, 2023

(54) VALVE LOCKOUT

(71) Applicant: DeZURIK, Inc., Sartell, MN (US)

(72) Inventor: Steven K. Neu, Paynesville, MN (US)

(73) Assignee: DeZURIK, Inc., Sartell, MN (US)

( * ) Notice: Subject to any disclaimer, the term of this patent is extended or adjusted under 35 U.S.C. 154(b) by 138 days.

(21) Appl. No.: 16/662,892

(22) Filed: Oct. 24, 2019

(65) Prior Publication Data
US 2020/0132215 A1 Apr. 30, 2020

Related U.S. Application Data

(60) Provisional application No. 62/750,028, filed on Oct. 24, 2018.

(51) Int. Cl.
*F16K 35/10* (2006.01)

(52) U.S. Cl.
CPC ........... *F16K 35/10* (2013.01); *Y10T 70/5619* (2015.04); *Y10T 137/7256* (2015.04)

(58) Field of Classification Search
CPC ........ F16K 35/00; F16K 35/02; F16K 35/025; F16K 35/10; Y10T 137/7256; Y10T 137/7069; Y10T 70/5615–5637
USPC .............. 137/385, 383; 70/175–180; 251/89, 251/90–93, 101–116
See application file for complete search history.

(56) References Cited

U.S. PATENT DOCUMENTS

| 2,221,101 A * | 11/1940 | Lefkowitz | F16K 35/025 74/509 |
| 2,364,909 A * | 12/1944 | Murphy | F16K 35/06 70/179 |
| 3,826,156 A * | 7/1974 | Dornaus | F16K 31/44 74/531 |
| 3,939,864 A * | 2/1976 | Donnelly | F16K 1/221 137/385 |
| 4,377,178 A * | 3/1983 | Thompson | F16K 35/06 137/385 |
| 5,116,018 A * | 5/1992 | Friemoth | F16K 35/06 251/110 |
| 5,261,445 A * | 11/1993 | Jones, Jr. | F16K 35/06 137/382 |
| 5,332,001 A * | 7/1994 | Brown | F16L 37/36 137/614.06 |
| 5,671,777 A * | 9/1997 | Allen | F16L 37/36 137/614.06 |
| 7,117,884 B2 * | 10/2006 | Shuter | F16K 35/022 137/385 |
| 8,857,790 B2 * | 10/2014 | Wong | F16K 35/10 251/149.9 |
| 11,248,720 B2 * | 2/2022 | Dzolovic | F16K 35/10 |

* cited by examiner

*Primary Examiner* — Kenneth Rinehart
*Assistant Examiner* — Jonathan J Waddy
(74) *Attorney, Agent, or Firm* — Pauly, DeVries Smith & Deffner LLC

(57) ABSTRACT

The present disclosure relates to valve lockout systems, including valve lockout systems for use with an actuator and butterfly valves. The lockout system allows controlled access to operation of the valve, either to prevent intentional or unintentional operation of the valve. Thus, the lockout system prevents the unauthorized opening or closing of the valve. The lockout system includes a lockout plate in which a lockout bar is positioned. The lockout bar includes a surface containing a recess. Depending upon the location of the recess the valve shaft can be opened or closed.

9 Claims, 11 Drawing Sheets

VALVE LOCKOUT

This application is a non-provisional application claiming priority to U.S. Provisional Application No. 62/750,028, filed Oct. 24, 2018, and the entire contents are incorporated herein by reference.

FIELD

Embodiments herein relate to an assembly for locking a valve from opening or closing.

BACKGROUND

Valves, such as butterfly valves, are used in many applications such as control of the movement of water, petroleum products, and other fluids. These valves are often used with a motorized actuator device that allows for opening and closing of the valve, either with local control or remote control. A desire exists to control access to operation of many valves to prevent undesired operation of the valve. It is also desirable to have any system for regulating opening and closing of the valve to work with an actuator.

SUMMARY

The present disclosure relates to valve lockout systems, including valve lockout systems for use with an actuator and butterfly valves. The lockout system allows controlled access to operation of the valve, either to prevent undesired operation of the valve. Thus, the lockout system prevents the unauthorized opening or closing of the valve. The lockout system includes a lockout plate in which a lockout bar is positioned. The lockout bar includes a surface containing a recess. Depending upon the location of the recess the valve shaft can be opened or closed.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The present disclosure relates to valve lockout systems, including valve lockout systems for use with an actuator and butterfly valves. The lockout system allows controlled access to operation of the valve to prevent undesired operation of the valve. Thus, the lockout system prevents the unauthorized opening or closing of the valve. The lockout system includes a lockout plate in which a lockout bar is positioned. The lockout bar includes a surface containing a recess. Depending upon the location of the recess the valve shaft can be opened or closed.

Figure 1:
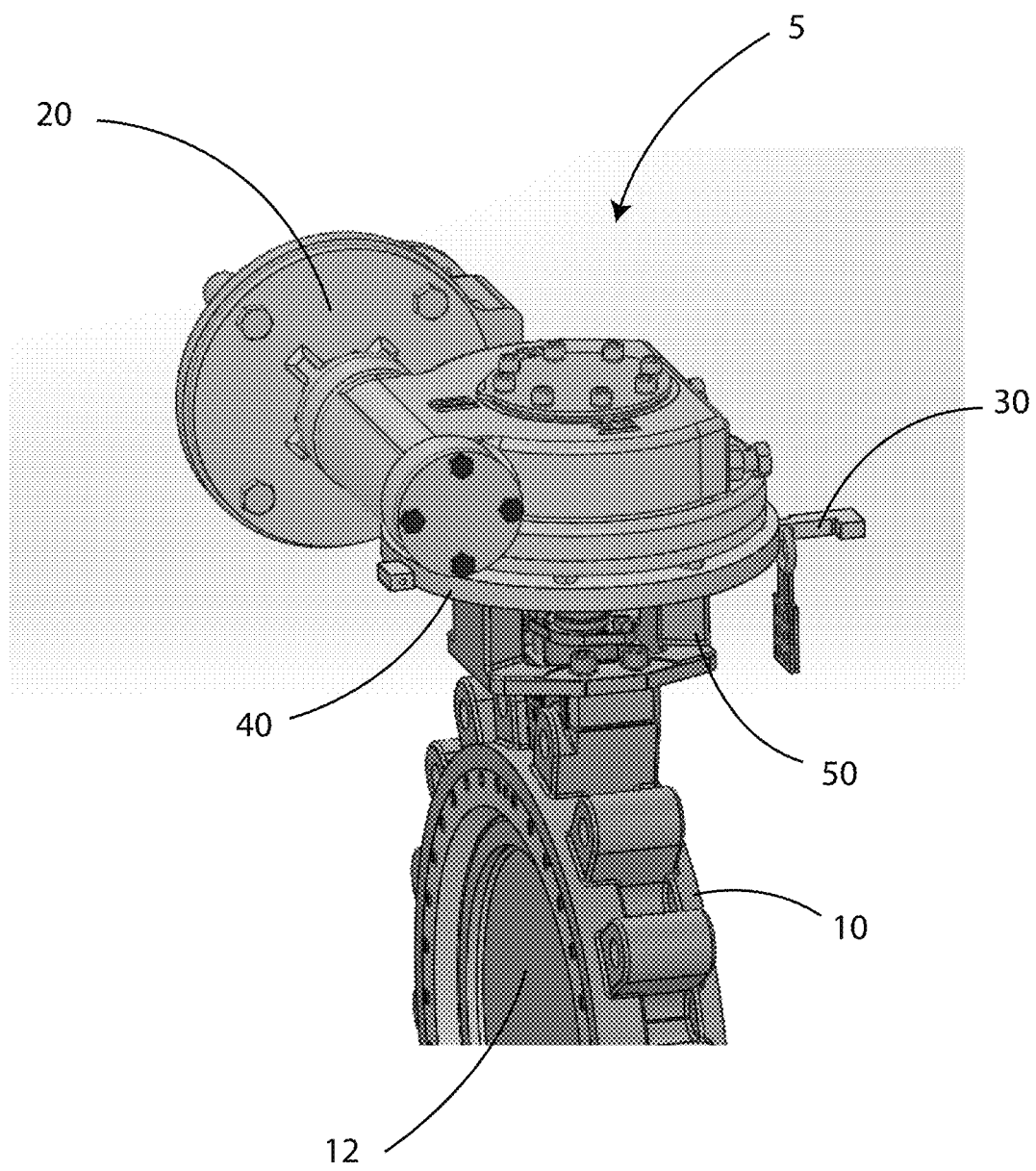
FIG. 1 is a perspective view of a butterfly valve showing an actuator and lockout system.

Now, in reference to the drawings, FIG. 1 is a perspective view of a valve assembly 5 showing a valve body 10 onto which is mounted an actuator 20 combined with a lockout system to prevent unauthorized or unintentional operation (opening or closing) of the valve. The lockout system includes a lockout bar 30 that is positioned within, and extends across, a lockout plate 40. The lockout plate 40 is secured between the actuator 20 and an adaptor 50 that is in turn connected to the valve body 10. The valve body 10 includes a disc 12.

Figure 2:
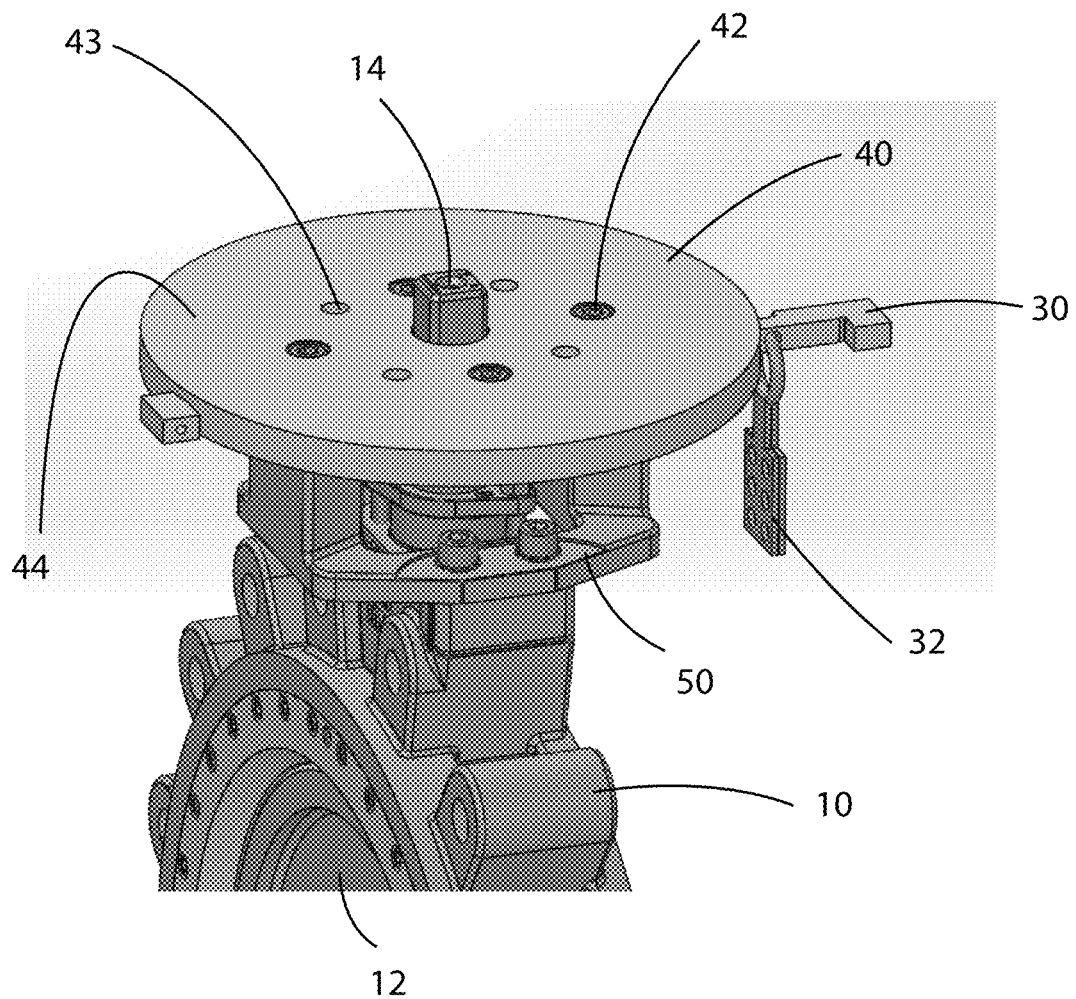
FIG. 2 is a perspective view of the butterfly valve of FIG. 1 showing the valve with the actuator removed but the lockout system installed, showing the valve in a closed position.

Referring now to FIG. 2, a perspective view of the butterfly valve assembly of FIG. 1 is shown with the actuator removed but the lockout system revealed, showing the valve body 10 and disc 12 in a closed position. The lockout plate 40 is shown with the lockout bar 30 indicated. The lockout bar 30 can slide back and forth within a channel in the lockout plate 40, moving from a locked position of FIG. 2 to an unlocked position (shown in FIG. 5, discussed below). The lockout bar 30 in FIG. 2 is shown with a locking hasp at first end 32 that is secured through a hole (not shown) in the lockout bar 30, preventing the movement of the lockout bar relative to the lockout plate 40. Lockout plate 40 is also shown with holes 42 through the top surface 44 of the lockout plate 40. The holes 42 include bolts that secure the lockout plate 40 to the adaptor 50. Additional holes through the lockout plate 40 are used for securing the actuator to the adaptor 50.

In addition, FIG. 2 shows the valve shaft 14 extending through the lockout plate 40. The valve shaft 14 passes through the disc 12, and rotation of the valve shaft 14 allows for opening and closing of the valve. The actuator 20 of FIG. 1 acts upon the valve shaft 14 to open and close the valve, and thus the lockout system prevents rotation of the valve shaft 14 when the valve is locked and allows rotation of the valve shaft 14 when the valve is not locked. This prevention of rotation or allowance of rotation is controlled by the position of the lockout bar 30, as will be described in further detail below.

Figure 3:
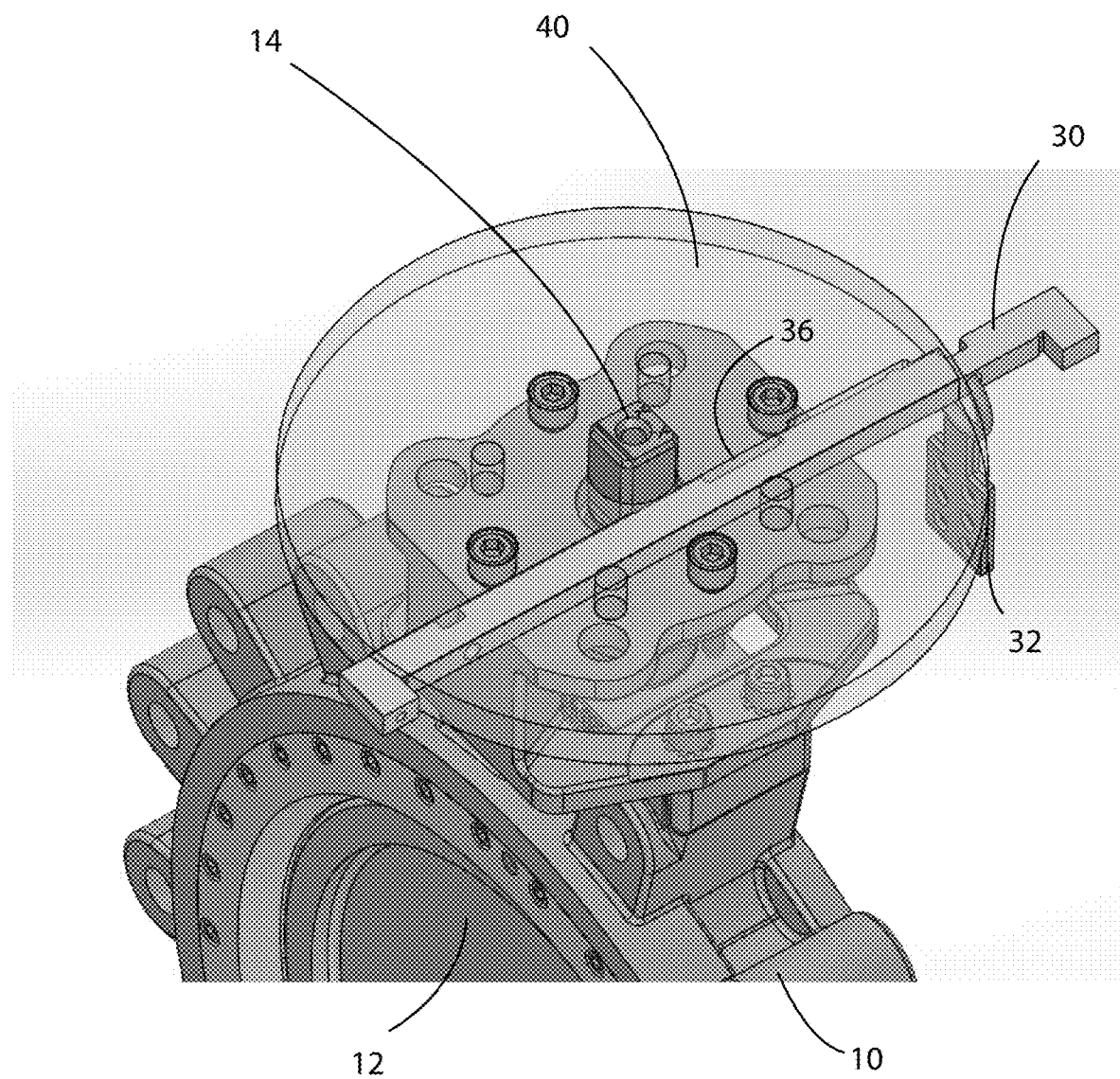
FIG. 3 is a perspective view of the butterfly valve of FIG. 1 showing the valve with the actuator removed but the lockout system installed, and the lockout plate shown in transparency, further showing the valve in a closed and locked position.

Now in reference to FIG. 3, a perspective view of the butterfly valve of FIG. 1 shows the valve with the actuator removed but the lockout system installed, and the lockout plate 40 shown in partial transparency, further showing the valve in a closed and locked by position of the lockout bar 30. The lockout bar 30 is shown in the same position as in FIG. 2. The lockout bar 30 is arranged within a slot 36 in the lockout plate 40, and as positioned in FIG. 3 the lockout bar prevents rotation of the valve shaft 14. Positioning the slot 36 next to the valve shaft 14 would allow the valve shaft 14 to rotate, but in this current locked state rotation is not possible. The manner in which this lockout function occurs is shown by review of FIG. 4 and FIG. 5, which is a perspective view of a lockout bar 30 for use in a valve lockout system.

Figure 4:
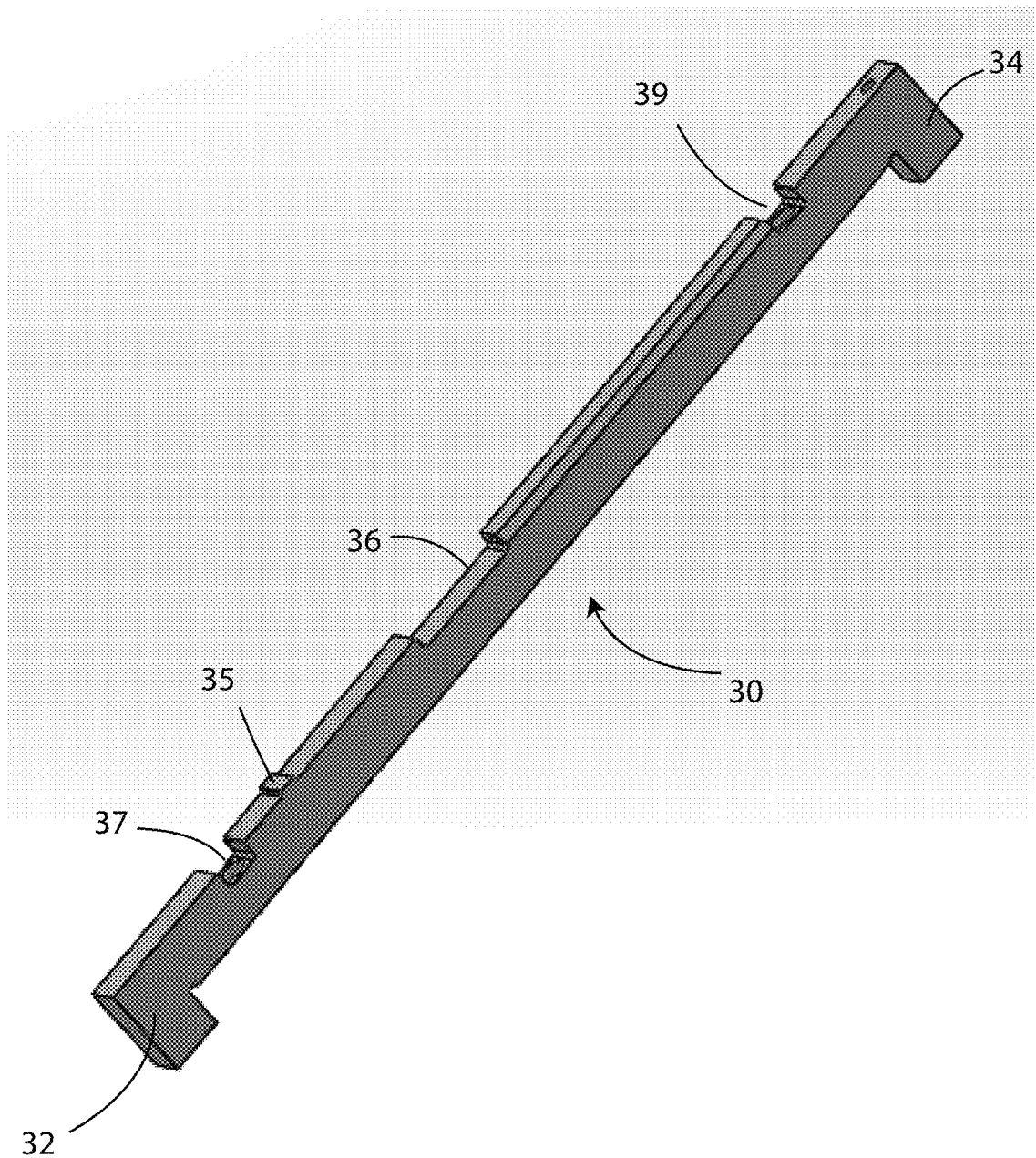
FIG. 4 is a perspective view of a lockout bar for use in a valve lockout system.

Referring now to FIG. 4, the lockout bar 30 includes a first end 32 and a second end 34, a primary notch 36, an optional protrusion 35, and optional secondary notches 37 and 39. The secondary notches 37, 39 contain holes through which a locking hasp may be installed. The lockout bar 30 slides back and forth within the lockout plate 40, and depending upon the location of primary notch 36 the valve shaft 14 can rotate or not rotate. In FIG. 3 the notch is not immediately adjacent to the valve shaft 14, so the rotation of the valve shaft 14 is prevented.

Figure 5:
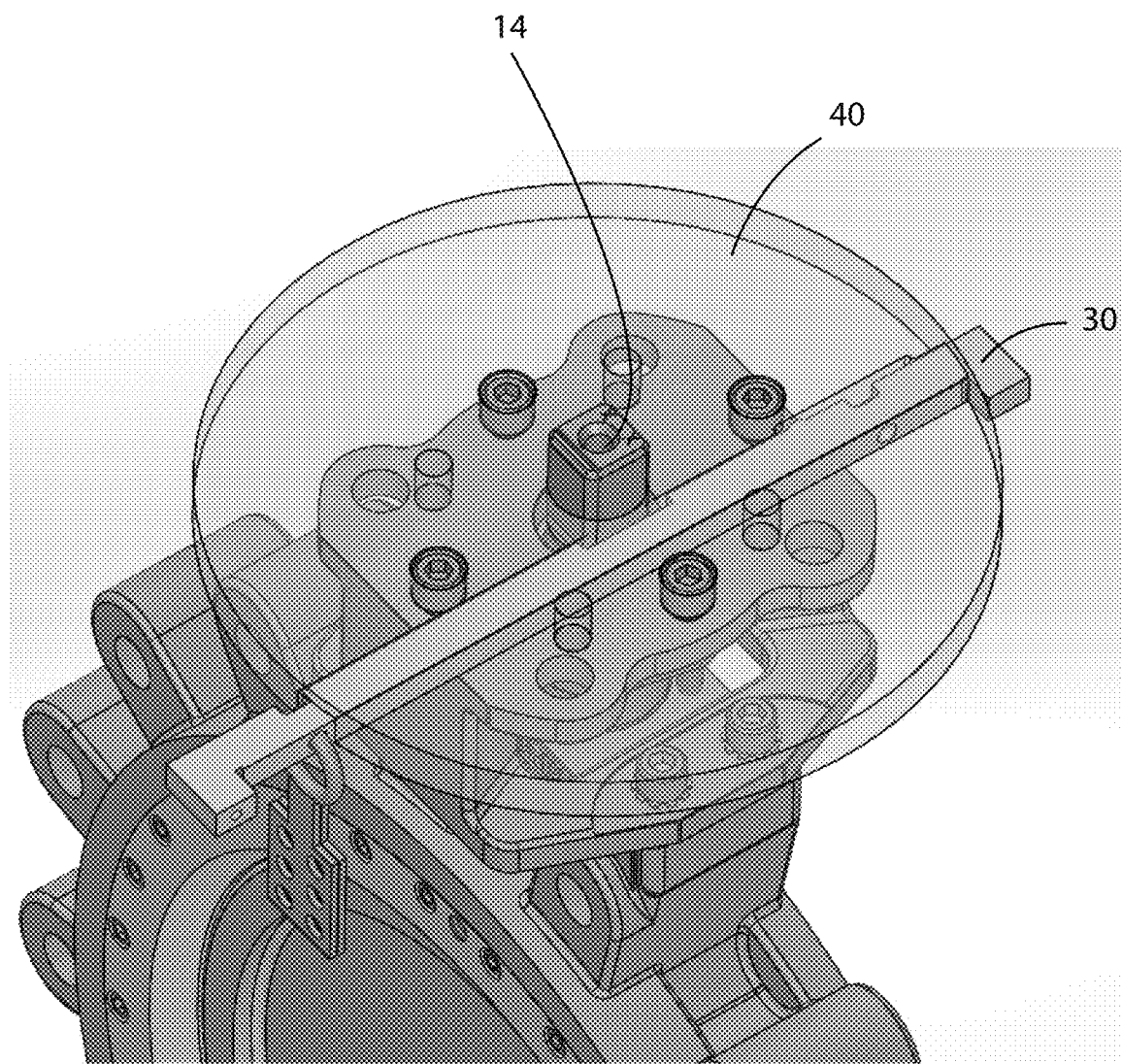
FIG. 5 is a perspective view of the butterfly valve of FIG. 1 showing the valve with the actuator removed but the lockout system installed, and the lockout plate shown in transparency, further showing the valve in a closed and unlocked position.

An unlocked valve is shown in FIG. 5, which is a perspective view of the butterfly valve of FIG. 1 showing the valve with the actuator removed but the lockout system installed, and the lockout plate shown in transparency, further showing the valve in a closed and unlocked position. In FIG. 5 the lockout bar 30 has been slid within lockout plate 40 so that the primary notch 36 aligns with the valve shaft 14. In this arrangement the notch allows rotation of the valve shaft 14. Lockout hasp at first end 32 is now shown secured to the opposite end of the lockout bar 30, now preventing movement of the lockout bar 30 and maintaining the valve in an unlocked position.

It will be apparent from review of the figures that the valve can be locked in either an open or a closed position depending upon the orientation of the valve shaft 14 when the lockout bar is lid into a locking position.

Figure 6:
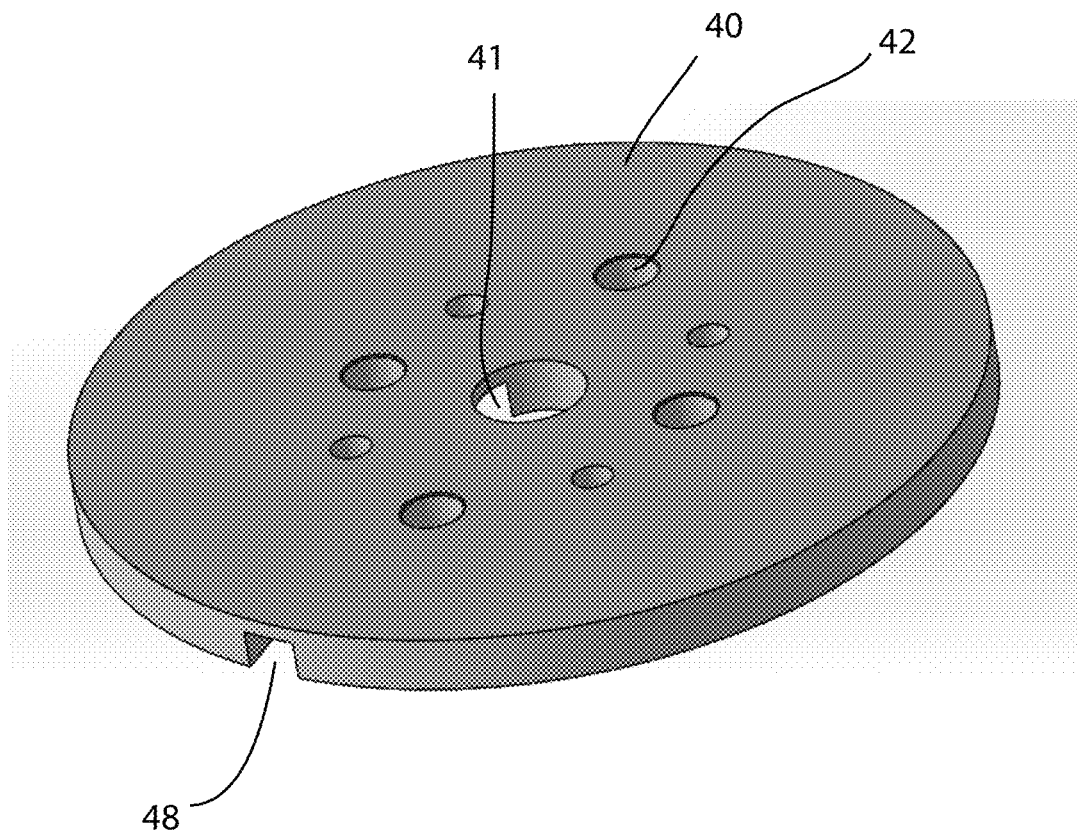
FIG. 6 is a top perspective view of a lockout plate for use in a valve lockout system.
Figure 7:
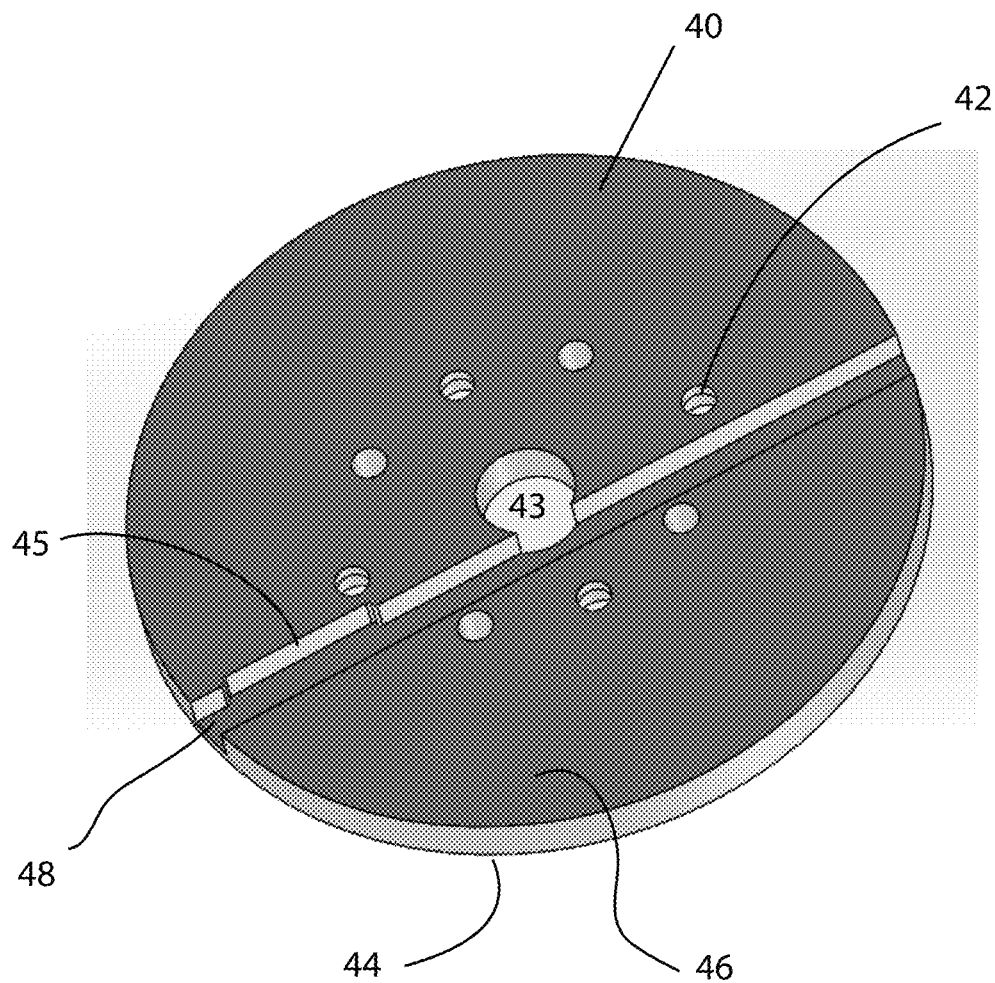
FIG. 7 is a bottom perspective view of a lockout plate for use in a valve lockout system.

FIG. 6 and FIG. 7 show the lockout plate in top and bottom views. Specifically, FIG. 6 is a top perspective view of a lockout plate 40; while FIG. 7 is a bottom perspective view of lockout plate 40. Lockout plate 40 includes holes 42 for securing the lockout plate 40 to the adaptor 50, as well as holes for securing the actuator 20 to the adaptor 50. In addition, the lockout plate 40 includes a central hole 41 that allows for rotation of the valve shaft 14. The top surface 44 and bottom surface 46 of the lockout plate 40 are shown, along with primary slot 48 within the underside of the lockout plate 40. The primary slot 48 within the lockout plate 40 also includes, in the embodiment shown, a recess 45. This recess 45 is configured to engage with the protrusion 35 of lockout bar 30. The recess 45 of the lockout plate 40 and protrusion 35 of the lockout bar 30 (see FIG. 4) combine to assure proper installation orientation of the lockout bar 30.

Figure 8:
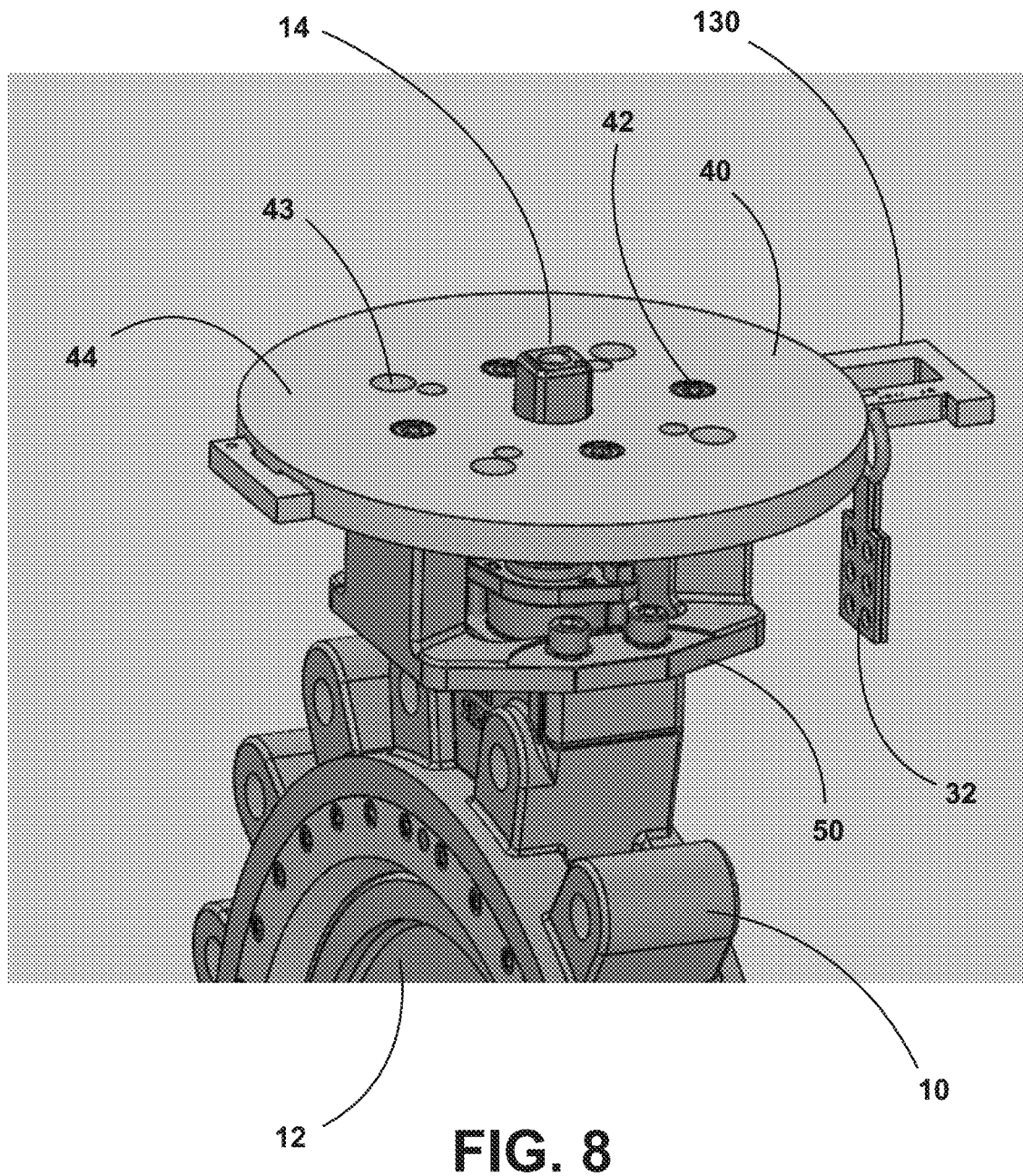
FIG. 8 is a perspective view of a butterfly valve showing the valve with the actuator removed but the lockout system installed, showing the valve in a closed position, the lockout system with two locking bars.

FIG. 8 is a perspective view of a butterfly valve showing the valve with the actuator removed but the lockout system installed, showing the valve in a closed position, the lockout system with a locking bar having two arms, the arms extending on either side of shaft 14. In reference to FIG. 8, a perspective view of butterfly valve assembly is shown with the actuator removed but the lockout system revealed, showing the valve body 10 and disc 12 in a closed position. The lockout plate 40 is shown with a lockout bar 130 indicated. The lockout bar 130 can slide back and forth within a pair of channels in the lockout plate 40, moving from a locked position to an unlocked position. The lockout bar 130 is shown with a locking hasp at a first end that is secured through a hole (not shown) in the lockout bar 130, preventing the movement of the lockout bar 130 relative to the lockout plate 40. Lockout plate 40 is also shown with holes 42 through the top surface 44 of the lockout plate 40. The holes 42 include bolts that secure the lockout plate 40 to the adaptor 50. Additional holes through the lockout plate 40 are used for securing the actuator to the adaptor 50.

In addition, FIG. 8 shows the valve shaft 14 extending through the lockout plate 40. The valve shaft 14 passes through to the disc 12, and rotation of the valve shaft 14 allows for opening and closing of the valve. The actuator acts upon the valve shaft 14 to open and close the valve, and thus the lockout system prevents rotation of the valve shaft 14 when the valve is locked and allows rotation of the valve shaft 14 when the valve is not locked. This prevention of rotation or allowance of rotation is controlled by the position of the lockout bar 130.

Figure 9:
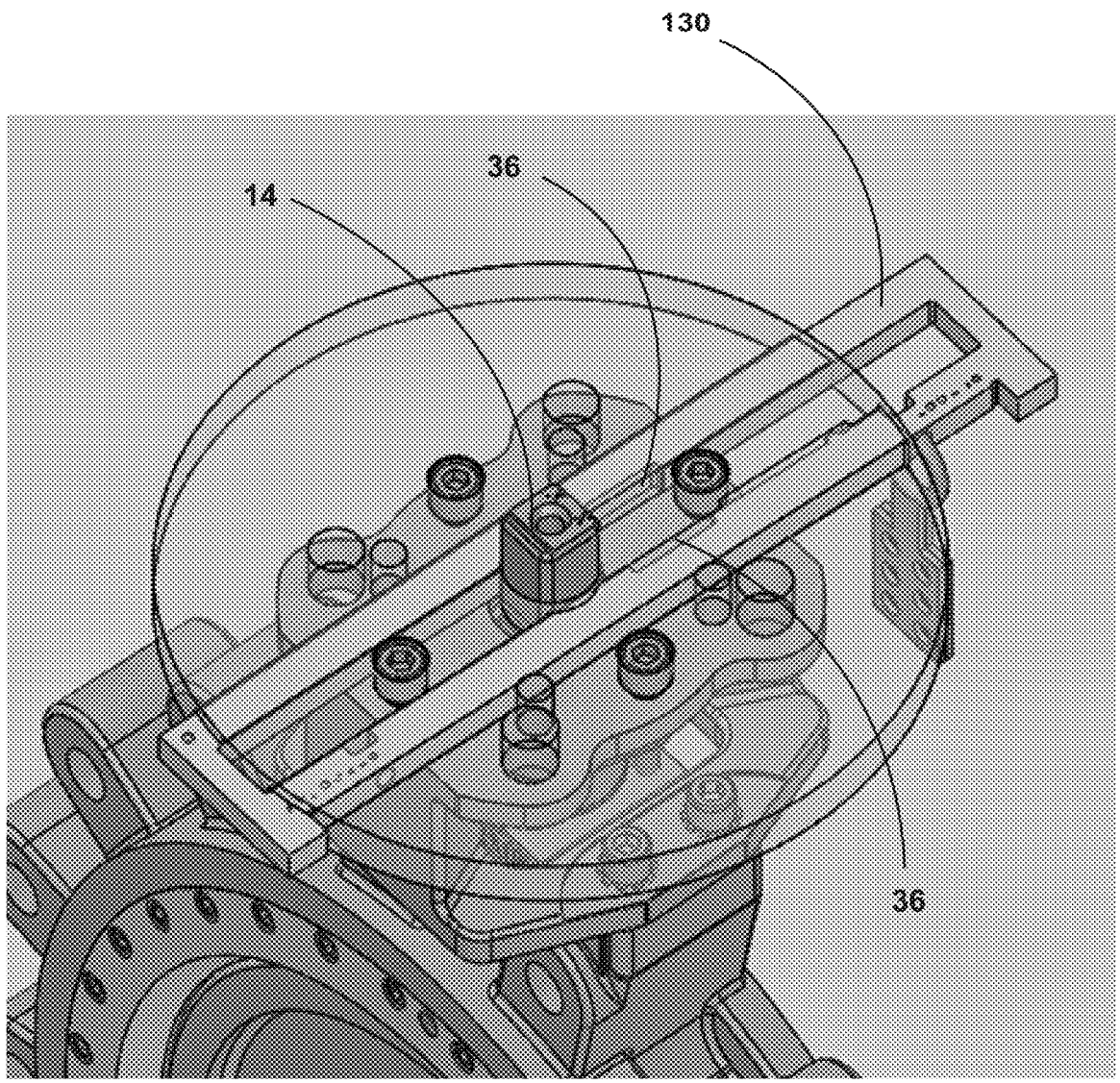
FIG. 9 is a perspective view of the butterfly valve of FIG. 8, showing the valve with the actuator removed but the lockout system installed, and the lockout plate shown in transparency, further showing the valve in a closed and locked position.

FIG. 9 is a perspective view of the butterfly valve of FIG. 8, showing the valve with the actuator removed but the lockout system installed, and the lockout plate shown in transparency, further showing the valve in a closed and locked position. The lockout plate 40 is shown in partial transparency, further showing the valve in a closed and locked by position of the lockout bar 130. The lockout bar 130 is shown in the same position as in FIG. 8. The lockout bar 130 has two arms arranged within a pair of slots in the lockout plate 40, and as positioned in FIG. 9 the lockout bar 130 prevents rotation of the valve shaft 14.

Figure 10:
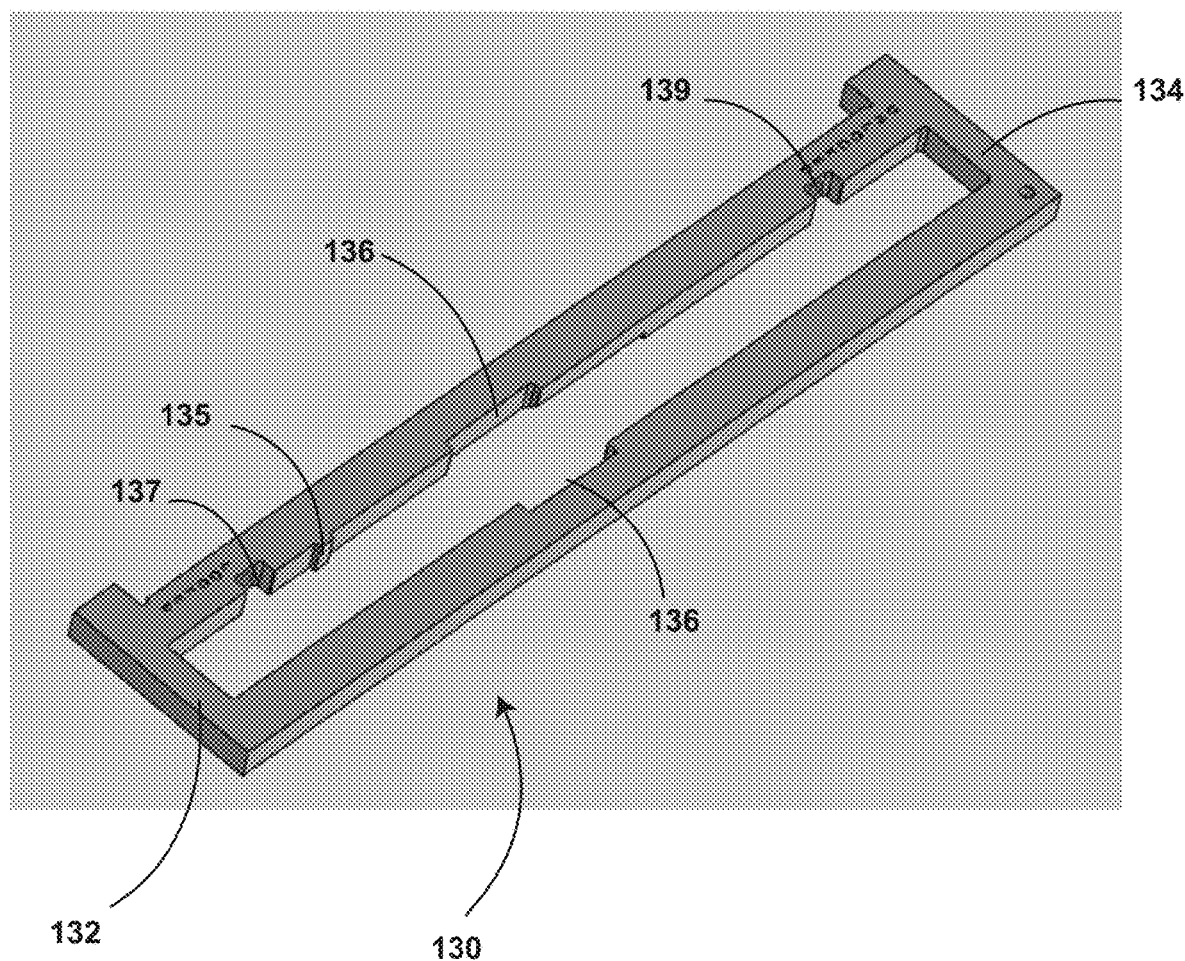
FIG. 10 is a perspective view of a lockout bar for use in a valve lockout system.

FIG. 10 is a perspective view of a lockout bar for use in a valve lockout system. The lockout bar includes a first end 132 and a second end 134, primary notches 136, an optional protrusion 135, and optional secondary notches 137 and 139. The secondary notches 137, 139 contain holes through which a locking hasp may be installed. The lockout bar 130 includes two arms, one with protrusion 135 and one without a protrusion 135. Both arms include primary notches 136. The lockout bar 130 slides back and forth within the plate 40 and depending upon the location of primary notch 136 the valve shaft 14 can rotate or not rotate.

Figure 11:
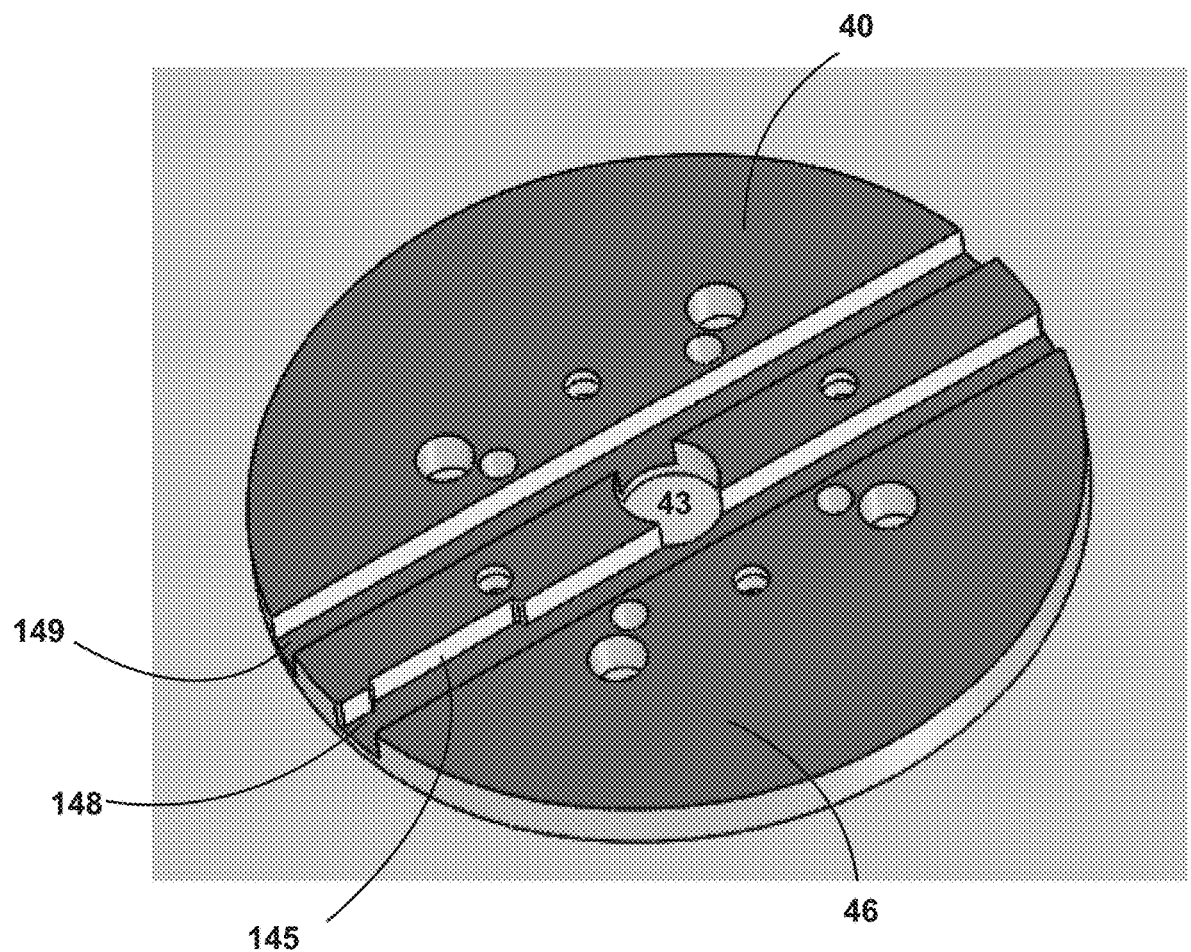
FIG. 11 is a bottom perspective view of a lockout plate for use in a valve lockout system.

FIG. 11 is a bottom perspective view of a lockout plate 40 for use in a valve lockout system. Lockout plate 40 includes holes 42 for securing the lockout plate 40 to the adaptor 50, as well as holes for securing the actuator 20 to the adaptor 50. In addition, the lockout plate 40 includes a central hole 43 that allows for rotation of the valve shaft 14. The top surface 44 and bottom surface 46 of the lockout plate 40 are shown, along with first slot 148 and second slot 149 within the underside of the lockout plate 40. The first slot 148 within the lockout plate 40 also includes, in the embodiment shown, a recess 45. This recess 145 is configured to engage with the protrusion 135 of lockout bar 130. The recess 145 of the lockout plate 40 and protrusion 135 of the lockout bar 130 (see FIG. 10) combine to assure proper installation orientation of the lockout bar 30.

It should be noted that, as used in this specification and the appended claims, the singular forms "a," "an," and "the" include plural referents unless the content clearly dictates otherwise. It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A valve lockout assembly, the valve lockout assembly comprising:
    a) a plate;
    b) a lockout bar retained by the plate, the lockout bar comprising a recess;
    c) a valve shaft configured to rotate between an open position and a closed position;
    wherein the lockout bar is retained by the plate in at least two positions:
        a first position where the recess is not aligned with the valve shaft and valve shaft rotation is prevented, and
        a second position wherein the recess is aligned with the valve shaft and valve shaft rotation is not prevented;
        wherein the lockout bar is configured to prevent rotation of the valve shaft while the valve shaft is in the open position and the closed position.

2. The valve lockout assembly of claim 1, wherein the plate includes a slot for retaining the lockout bar.

3. The valve lockout assembly of claim 1, wherein the plate further includes an opening for the valve shaft.

4. The valve lockout assembly of claim 1, further comprising a protrusion on the lockout bar, the protrusion configured to move within a recess of the lockout plate to restrict movement of the lockout bar.

5. The valve lockout assembly of claim 1, further comprising mounting holes in the plate.

6. The valve lockout assembly of claim 1, further comprising holes in the lockout bar for retaining a lock or lockout hasp.

7. The valve lockout assembly of claim 1, wherein the valve shaft has at least one flat surface.

8. The valve lockout assembly of claim 1, wherein the lockout plate is substantially circular.

9. The valve lockout assembly of claim 1, wherein the lockout bar includes at least two arms.

* * * * *